J. F. SCHUYLER, dec'd.
W. E. LOCKWOOD, Assignee.

Machine for Planishing Paper.

No. 6,470. Reissued June 1, 1875.

Witnesses.
Hubert Howson
Harry Smith.

Wm. E. Lockwood
By his Attys
Howson & Son

UNITED STATES PATENT OFFICE.

WILLIAM E. LOCKWOOD, OF PHILADELPHIA, PENNSYLVANIA, ASSIGNEE OF JOHN F. SCHUYLER, DECEASED.

IMPROVEMENT IN MACHINES FOR PLANISHING PAPER.

Specification forming part of Letters Patent No. 37,790, dated February 24, 1863; reissue No. 6,470, dated June 1, 1875; application filed March 4, 1875.

*To all whom it may concern:*

Be it known that JOHN F. SCHUYLER, deceased, late of Philadelphia, Pennsylvania, did invent an Improvement in Planishing Paper, or fabrics composed partly of paper; and I do hereby declare the following to be a full, clear, and exact description of the same, reference being had to the accompanying drawing and to the letters of reference marked thereon.

The object of this invention is to impart to paper or pasteboard a smooth surface, and more especially to impart to one side of the fabric composed of muslin and paper combined the glossy enameled surface, and more especially for so planishing the fabric composed of muslin and paper combined as to impart to one side of the same the glossy enameled surface required when the said fabric is used for making shirt-collars and other articles of wearing apparel.

In order to enable others to make and use the said invention, I will now proceed to describe its construction and operation.

Figure 1:
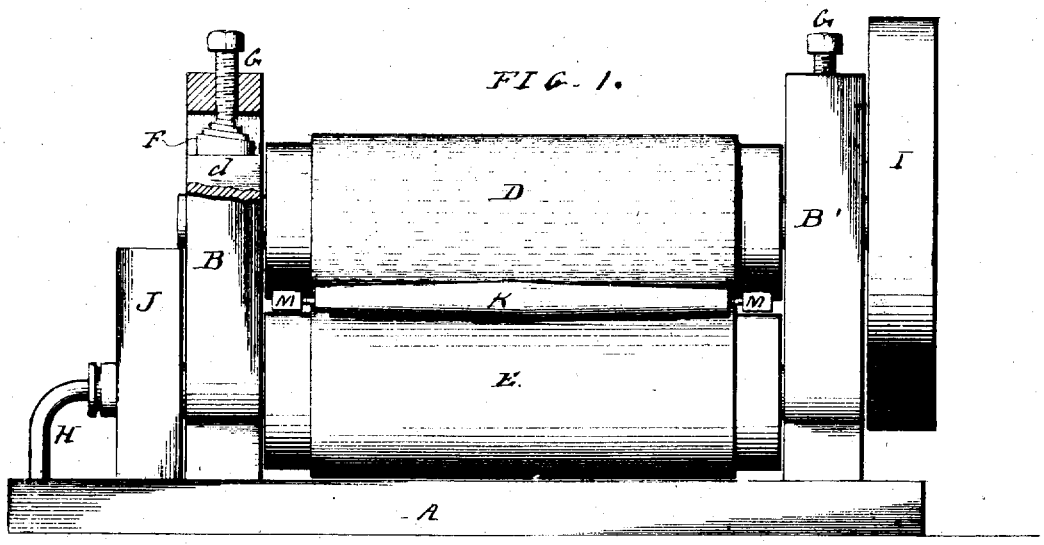
Figure 2:
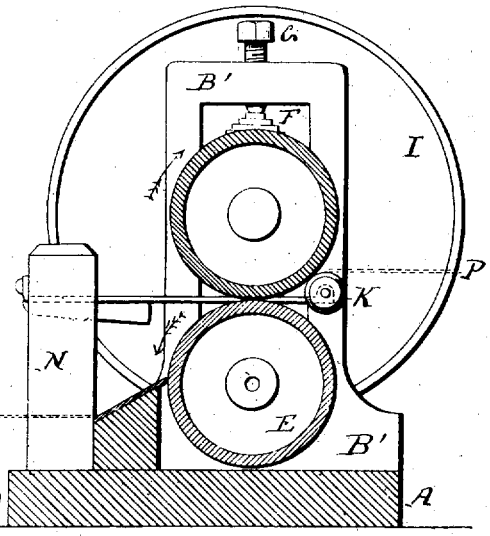
Figure 3:
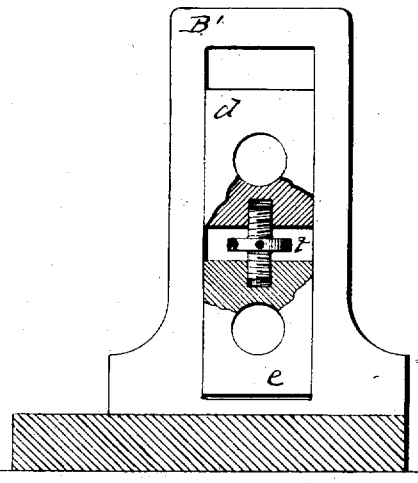

On reference to the accompanying drawing, which forms a part of this specification, Figure 1 is a front view; Fig. 2, a transverse vertical section of this improved machine for planishing paper, &c.; Fig. 3, a detached view of a portion of the machine.

A is the base-plate of the machine, and to this plate are secured the standards B and B′. D and E are the upper and lower rollers, the journals of the latter turning in stationary boxes *e*, fitted to the standards B and B′, and the journals of the upper roller D turning in boxes *d*, which are adapted to vertical guides, and can be adjusted therein to an extent limited by the helical springs F and bolts G, one of the latter screwing into and passing through the top of each standard, and bearing with its point on the apex of the spring. The two rollers are maintained at any desired distance apart from each other, and this distance can be readily adjusted by set-screws T, Fig. 3. A pipe, H, fitting into a stuffing-box on the projecting end of one of the journals of the lower roller E, serves to convey steam to the interior of the latter, and to maintain the surface of the roller at the desired temperature. Motion is communicated to the upper roller by means of a belt passing round a pulley on any adjacent driving-shaft and round the pulley I, and a rotary motion is imparted to the lower roller E by a strap passing round the pulley J, the rollers revolving in contrary directions to each other, as pointed out by the arrows, the upper roller, however, revolving at a slower speed than the lower roller. To two posts, N N, are secured the two springs M M, which pass between the rollers, one spring near one end and the other near the opposite end of the said rollers, at the points where the latter are reduced in diameter. On the outer end of these springs are formed bearings for the journals of the roller K, which is somewhat larger in diameter in the middle than at the opposite ends, and which bears against the upper roller D only.

Although the above-described machine is applicable to the planishing of paper and pasteboard, it has been especially designed for the purpose of imparting a smooth, glossy surface to one side of the fabric composed of muslin, with paper pasted on each side, this fabric being used for making what are known as enameled collars. The fabric in the act of drying becomes more or less creased, and is of such a nature that the desired uniform and smooth surface cannot be efficiently imparted to it by ordinary calender-rollers.

The lower roller E of the said improved planishing-machine is made of cast-iron, its surface being as smooth and even as possible. The upper roller, however, which is also made of cast-iron, has a number of minute longitudinal ridges formed on the surface by the process known as draw-filing—that is, by drawing a file backward and forward longitudinally over the surface. A sheet of fabric of the proper size is placed on the surface of the table, (shown by the dotted line P,) its front edge being directed to the point where the small roller K bears against the upper roller D, between which the fabric passes toward the point where the upper roller D is nearest to the lower roller E, between which rollers the fabric also passes, and is finally directed onto the surface of a table. (Shown by the dotted line Q.)

The roller K serves a twofold purpose: First, being larger in diameter in the middle than at the opposite ends, it tends to spread or stretch the fabric laterally from the middle toward the edges, thereby removing the inequalities and creases, and reducing the sheet to proper condition prior to being submitted to the action of the rollers D and E, for if the inequalities and creases are not thus removed, they will appear on the fabric after passing between the rollers. The other object of the roller K is to press the fabric forcibly against the surface of the roller D prior to passing between the latter roller and the roller E, the ridges of the upper roller penetrating the fabric, and causing it to traverse at the same speed as the circumference of that roller—a speed at which it must continue to move during its passage between the two rollers. In presenting the fabric to the two rollers D and E, in the absence of the supplementary roller K the lower roller would have a tendency to move the fabric at too fast a speed; hence no planishing of the surface of the fabric could take place, for it is by retarding the fabric and causing the smooth, heated surface of the lower roller to move faster than the fabric that the desired planishing is accomplished; hence the importance of the roller K as a means of assisting the draw-filed roller D to retard the fabric, in order that the desired smooth enameled surface may be imparted to one side of the same.

I do not desire to claim broadly the planishing of paper by passing it between two rollers running at different speeds, as this is done in the ordinary calendering-machine; but

I claim as the invention of the said SCHUYLER, and desire to secure by Letters Patent—

1. As an improvement in the art of planishing paper, submitting the paper to friction under pressure between a roughened feed-roller and a planisher, substantially as described.

2. The combination, in a paper-planishing machine, of a planisher with a draw-filed roller, for controlling the paper while it is under pressure between the said roller and planisher, all substantially as set forth.

3. The auxiliary roller K, of the form described—that is to say, rounded longitudinally, and larger in diameter in the middle than at the ends—in combination with the upper and lower rollers D and E, for the purpose specified.

In testimony whereof I, the said WM. E. LOCKWOOD, have signed my name to this specification in the presence of two subscribing witnesses.

WILLIAM E. LOCKWOOD.

Witnesses:
HUBERT HOWSON,
HARRY SMITH.